United States Patent Office 3,132,896
Patented May 12, 1964

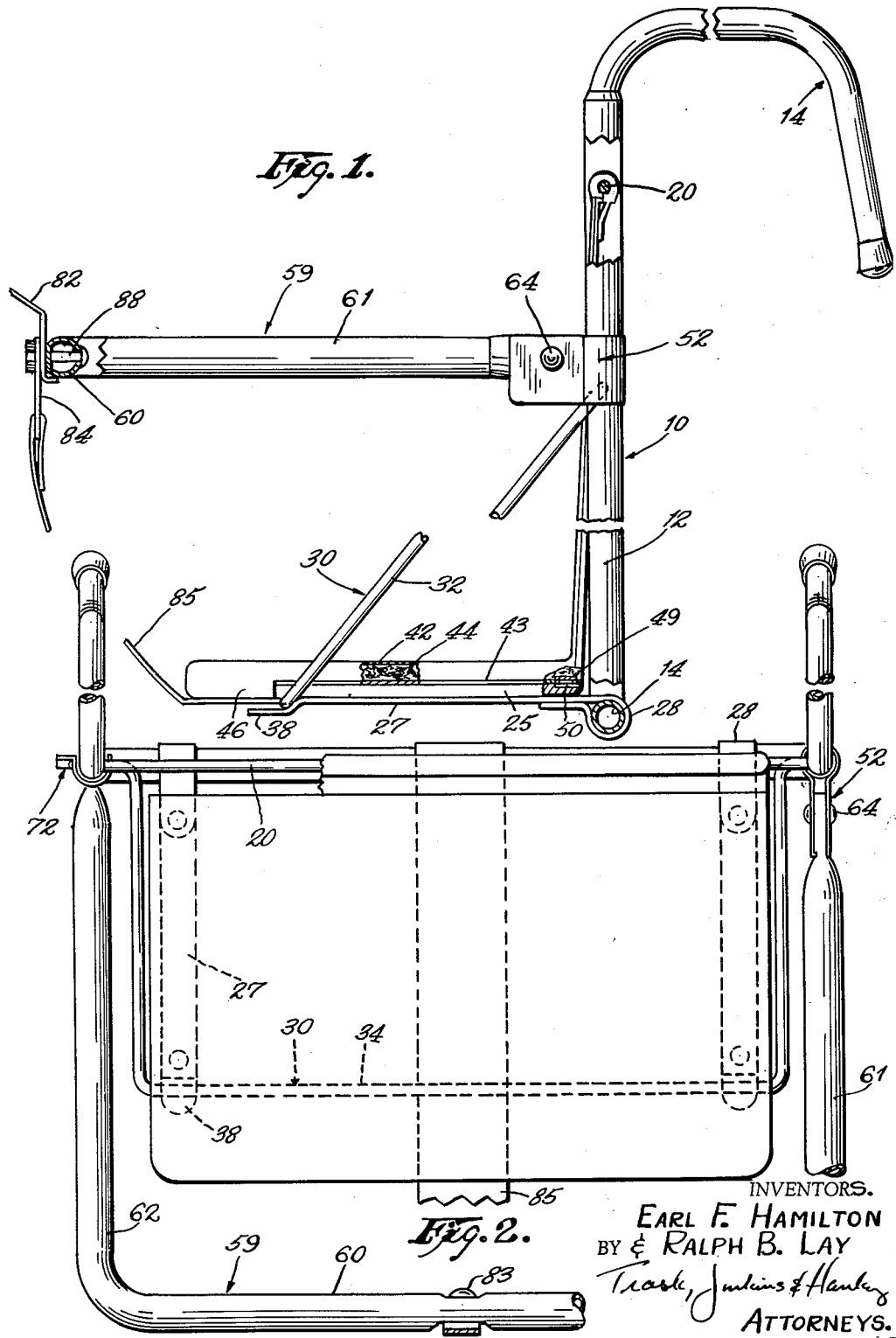

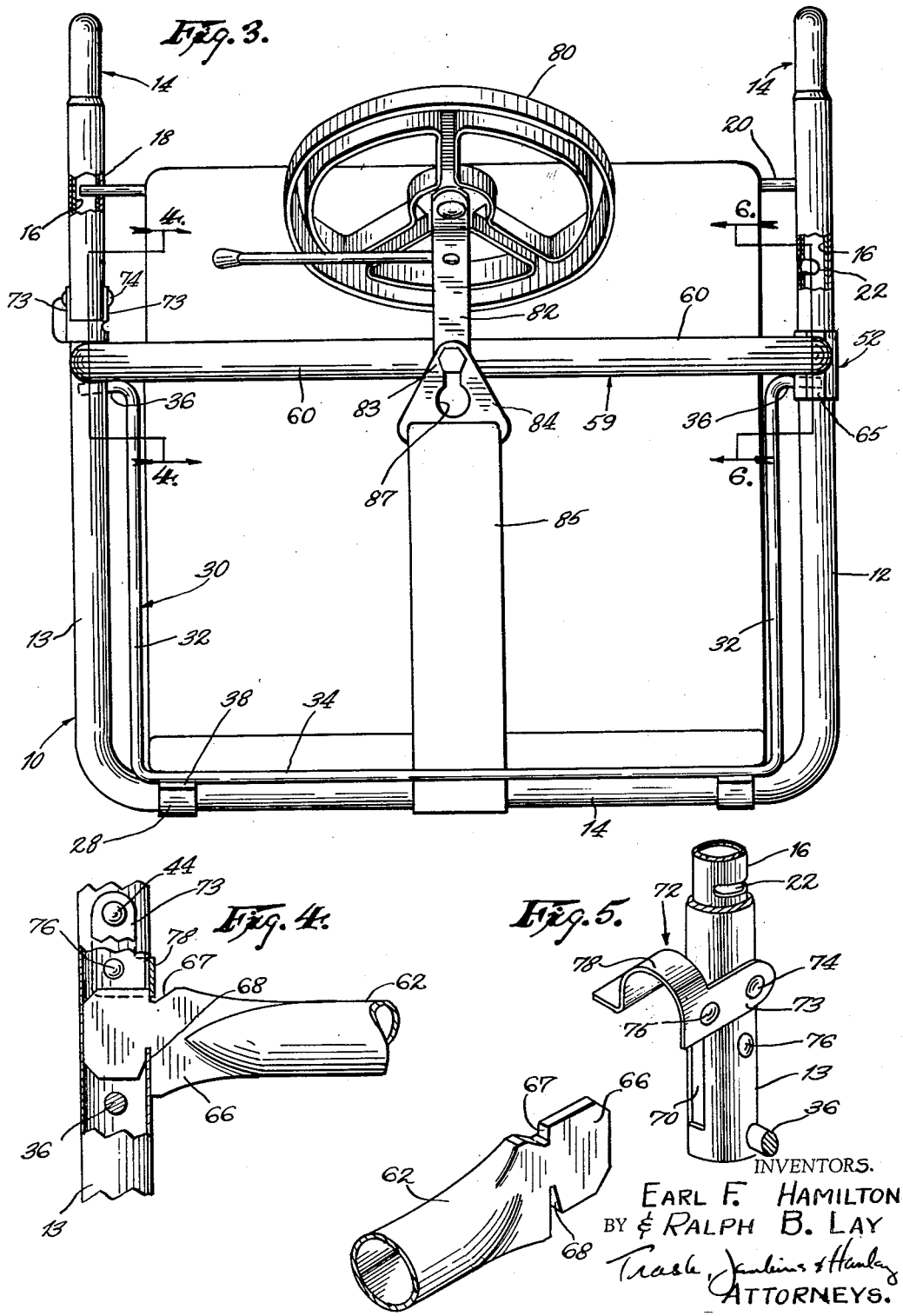

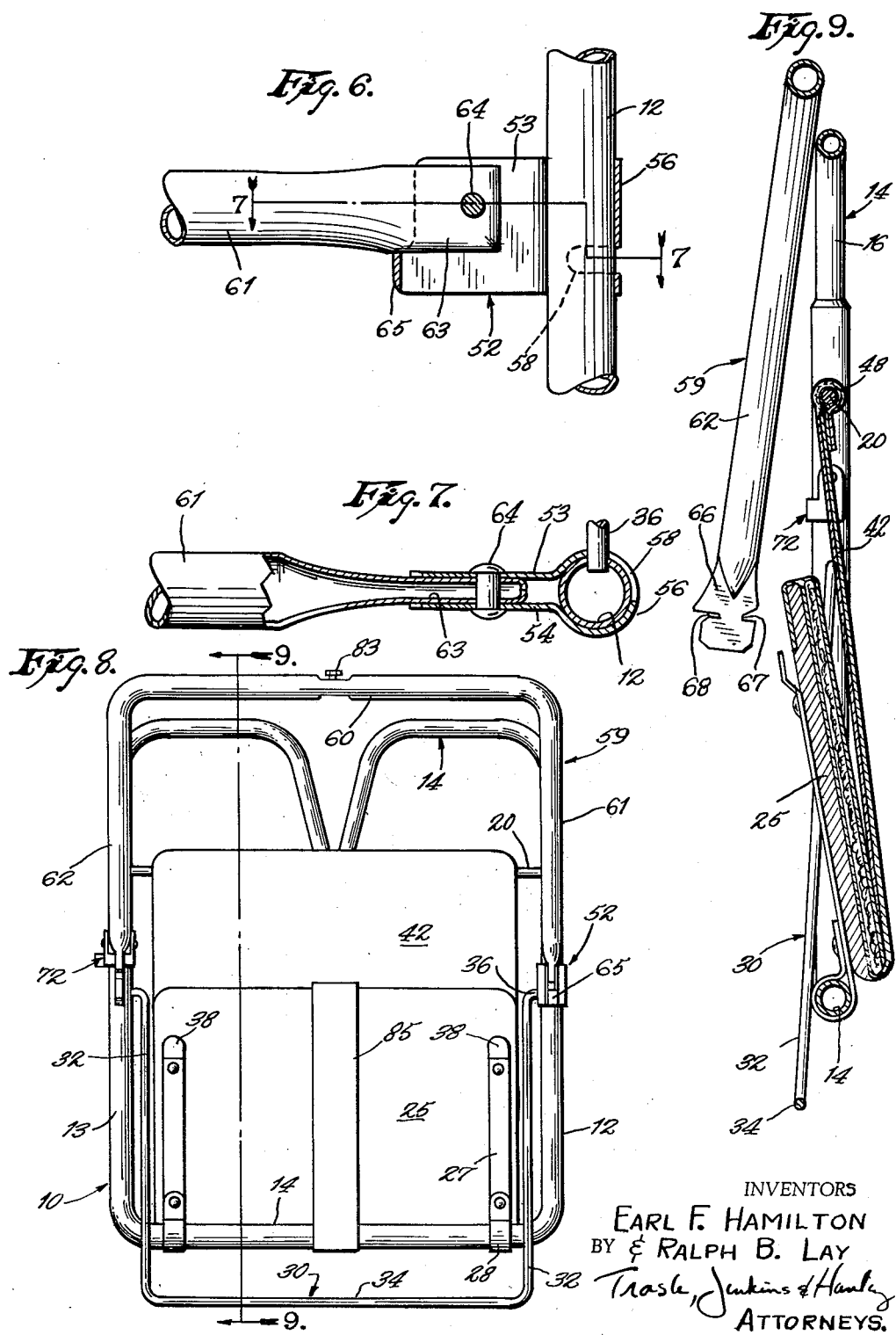

3,132,896
INFANT'S CAR SEAT
Earl F. Hamilton and Ralph B. Lay, Columbus, Ind., assignors to Hamilton Cosco, Inc., Columbus, Ind., a corporation of Indiana
Filed Sept. 10, 1962, Ser. No. 222,332
4 Claims. (Cl. 297—256)

This invention relates to an infant's car seat, and has for its objects the provision of such a car seat which can be easily mounted on an automobile seat back, which can be economically manufactured largely from inexpensive metal-tubing, which can be easily manipulated to permit an infant to be placed in or removed from said seat without lifting, which can be easily adjusted to support an infant in a standing position, which can be easily adjusted to accommodate infants of different sizes, and which is collapsible for compact storage or shipment.

According to the preferred form of our invention, there is provided a back frame having a pair of interconnected laterally spaced uprights to which a pair of downwardly open support hooks are operatively connected for supporting the car seat on an automobile seat back. A seat is swingably interconnected to the back frame on a transverse axis and is releasably retained in an operative generally horizontal position by a stirrup swingably connected to the upright back frame stretches and releasably engageable with the seat. A generally U-shaped guard rail is operatively connected to the back frame above the seat. The guard rail, when in operative position, projects forwardly from the back frame for retaining an infant on the seat and, so that upon release of the stirrup from the seat to permit the seat to be swung downwardly, an infant may stand upon the automobile seat and grasp the guard rail to support himself in a standing position. Conveniently, one end of the guard rail is lockingly engageable with one of the upright back frame stretches and the opposite end of said guard rail is swingably interconnected to the other of said upright stretches on vertical and horizontal axes, whereby upon unlocking of said one guard rail from said one upright stretch, the guard rail may be swung into a collapsed position in which it is generally parallel with the back frame. Further, such construction permits the guard rail to be swung relative to the back frame so that an infant may be placed upon the seat without having to be lifted over said guard rail.

Other objects and features of our invention will become apparent from the more detailed description which follows, and from the accompanying drawings, in which:

FIG. 1 is a fragmentary side elevation of an infant's car seat embodying our invention, but with portions thereof being broken away;

FIG. 2 is a fragmentary plan view of the car seat shown in FIG. 1;

FIG. 3 is a front elevation of the car seat shown in FIG. 1, but with portions thereof being broken away;

FIG. 4 is an enlarged vertical section taken on the line 4—4 of FIG. 3;

FIG. 5 is an enlarged perspective view of the guard rail locking assembly shown in FIG. 4, but showing said assembly in unlocked position;

FIG. 6 is an enlarged vertical section taken on the line 6—6 of FIG. 3;

FIG. 7 is a horizontal section taken on the line 7—7 of FIG. 6;

FIG. 8 is a front elevation of the car seat shown in FIG. 1, but showing said seat in collapsed position; and FIG. 9 is an enlarged vertical section taken on the line 9—9 of FIG. 8.

As shown in the drawings, our infant's seat comprises a back frame 10 formed from a length of metal tubing bent into a generally U-shape to provide a pair of laterally spaced uprights 12 and 13 interconnected at their lower ends by a bight 14. A pair of supporting hooks 14 are connected to the uprights 12 and 13 and are adapted to be received over the upper end of an automobile seat back for supporting our car seat thereon. The hooks are provided with legs 16 projecting into the upper ends of the uprights 12 and 13 and having aligned openings 18 formed therein for the reception of a transversely extending stretcher rod 20 projecting through openings in the uprights 12 and 13. The stretcher 20 serves to interconnect the uprights 12 and 13 adjacent their upper ends and, by being received in the hook openings 18, further serves to retain said hooks in fixed positions projecting rearwardly from the back frame 10. Adjacent their lowered ends, each of the hook legs 16 is provided with an arcuate slot 22 having an arcuate extent of about 90°. By springing the back frame uprights 12 and 13 laterally outwardly the stretcher 20 can be removed from the openings 18 in the hook legs 16 to slide said hooks upwardly for reinsertion of the stretcher 20 into the leg slots 22. With the stretcher 20 received in the slots 22, the bottom of the seat frame 10 will be displaced downwardly relative to the hooks 14 to dispose the car seat nearer the automobile seat so that it may be used for smaller sized infants. Further, with the stretcher received in the arcuate slots 22, the hooks 14 may be swung inwardly into collapsed positions in which they lie in planes closely adjacent and generally parallel to the plane of the back frame 10 for compact storage or shipment, as shown in FIG. 9.

The back frame 10 supports a seat 25 swingably interconnected to said back frame by a pair of hinges 27 rigidly connected to the bottom face of the seat 25 and having their rearwardly disposed ends 28 rotatably mounted on the back frame bight 14. The seat 25 is releasably retained in an operative position generally normal to the plane of the back frame 10 by a stirrup 30 conveniently formed from a wire rod and comprising a pair of legs 32 interconnected at their lower ends by a transversely extending bight 34 and having their upper ends bent outwardly, as at 36. The stirrup ends 36 are swingably received in aligned openings in the inner faces of the back frame uprights 12 and 13 below the stretcher 20 to permit said stirrup to be swung over the forward end of the seat 25 to engage the lower face of said seat for supporting it in an operative position generally normal to the plane of the back frame 10. Conveniently, the stirrup bight 34 is receivable in a pair of locking fingers conveniently in the form of forwardly open offsets 38 on the hinges 27 and disposed forwardly of the transverse seat center line for releasably retaining said seat in its operative position.

Conveniently, a pad is disposed over the upper face of the seat 25 and comprises a pair of plastic sheets 42 sealed along their edges, as at 43, and having a resilient pad 44 encapsulated therebetween. The forward edges of the sheets 42 are folded and secured together to form a pocket 46 received over the forward edge of the seat 25 for retaining the forward edge of the pad thereon. The sheets 42 extend upwardly from the rear edge of the seat 25 and adjacent their upper ends have a pad 48 encapsulated therebetween in the same manner as the pad 44. The sheets 42 are folded over the stretcher 20 and secured therearound with the pad 48 cushioning the stretcher 20. Conveniently, the bottom sheet 42 adjacent the rear edge of the pad 44 is provided with a snap 49 lockingly engageable with a cooperative snap 50 on the upwardly presented face of the seat 25 adjacent its rear edge for retaining the rear edge of the pad 44 in position overlying the seat and for retaining the portion of the sheets 42 between the rear edge of the seat 25 on the stretcher 20 in position to form a seat back rest.

As is best shown in FIGS. 6 and 7, a sheet-metal bracket 52 is mounted on the upright 12 and comprises a pair of parallel legs 53 and 54 integrally connected at their rearward ends by a sleeve 56 received around the upright 12. To rotatably mount the bracket 52 in a fixed vertical position on said upright, the sleeve 56 is provided with an arcuate slot 58 through which one of the stirrup ends 36 extends for reception into the upright 12.

The bracket 52 operatively connects a guard rail 59 to the back frame 10. Said guard rail is conveniently formed from a length of metal-tubing bent into a generally U-shape to provide a transversely extending bight 60 interconnecting a pair of parallel arms 61 and 62. One end of the arm 61 is flattened, as at 63, for reception between the bracket legs 53 and 54. The guard rail end 63 and bracket legs 53 and 54 are provided with aligned openings through which a rivet 64 extends for swingably interconnecting the guard rail to said bracket on a horizontal axis. Conveniently, as shown in FIG. 6, the bracket leg 54 has its end remote from the sleeve 56 bent, as at 65, to underlie the guard rail end 63 for supporting said guard rail in a generally horizontal position normal to the plane of the back rest 10.

As shown in FIG. 4, the end of the guard rail arm 62 is also flattened, as at 66, and is provided with notches 67 and 68 formed in its upper and lower faces, respectively. The rail end 66 is insertable into a vertically extending slot 70 formed in the upright 13 with its notch 68 resting on the bottom of said slot for thus interconnecting the guard rail end 66 to the back frame. To releasably lock the guard rail in the slot 70, a latch 72 is mounted on the upright 13, and comprises a pair of arms 73 pivotally connected to side faces of the upright 13, as at 74. Conveniently, one of the arms 73 is also provided with a boss 75 releasably engageable with a dimple 76 formed in the upright 13 to releasably retain the latch 72 in its locked position. The arms 73 are interconnected by an arcuate strip 78 which, upon downwardly swinging of the arms 73, abuts the forwardly presented face of the upright 13 and has its lower edge received in the notch 67 formed in the guard rail end 66 to thus releasably lock said guard rail in the slot 70.

Conveniently, our infant seat may be further provided with a steering wheel 80 mounted in any convenient manner on a post 82. As shown in FIG. 1, the lower end of the post 82 is mounted on the guard rail bight 60 by a shouldered bolt 83 having its head spaced outwardly from said bight. Receivable over the shank of the bolt 83 between the head thereof and the guard rail 59 is a catch 84 connected to a crotch strap 85 extending downwardly from the guard rail 59 below the seat 25 and provided at its end opposite the catch 84 with a loop receivable over the back frame bight 14. As shown, the catch 84 is provided with a keyhole-shaped opening 87 to permit the catch 85 to be easily received over the head of the bolt 83.

In order to permit our car seat to be used to support an infant in a standing position on an automobile seat, the seat 25 is swung upwardly about the axis of the back frame bight 14, and the stirrup 30 is released from the hinge offsets 38. Then, upon releasing the catch 84 from the bolt 83, the seat is free to swing downwardly, and the stirrup will swing in a like direction to permit vertical clearance within the extent of the guard rail 59 so that the infant may stand upon the automobile seat and grasp the guard rail 59 for support.

To move our car seat into the fully collapsed position shown in FIGS. 8 and 9, the hooks 14 are disposed in the uprights 12 and 13 so that the stretcher 20 is received in the hook openings 22. In this manner, the hooks may be swung inwardly about the vertical axes of said uprights into collapsed positions in which they are generally parallel with the stretcher 20. The forward edge of the seat 25 is the next raised to permit the stirrup 30 to swing out of the hinge offsets 38, and with said stirrup out of its supporting position, the latch 72 is then swung upwardly about its pivotal connection 74 to permit the guard rail 59 to be swung about the axis of the upright 12 to free the guard rail end 66 from the upright 13. After the guard rail end 66 has cleared the upright slot 70, said guard rail may be swung upwardly about the axis of the rivet 64 into its retracted position in which it is generally parallel with the plane of the back frame 10. And the seat 25, being freed from the support of the stirrup 30 is then free to be swung upwardly about the axis of the back frame bight 14 into a position in which it also lies generally parallel with the plane of the back frame 10.

We claim:

1. An infant's car seat, comprising
   (a) a back frame having a pair of interconnected laterally spaced uprights,
   (b) a pair of downwardly open support hooks operatively connected to said uprights,
   (c) a seat swingably interconnected to said back frame on a transverse axis,
   (d) a U-shaped guard rail having one of its ends lockingly engageable with one of said pair of uprights and its opposite end swingably connected on a transverse axis to means rotatably mounted on said other of said pair of uprights whereby said rail is horizontally and vertically swingable with respect to said back frame,
   (e) said seat and guard rail being swingable between retracted positions generally parallel with said back frame and operative positions generally normal thereto, and
   (f) a U-shaped stirrup having one of its ends swingably connected to said one of said uprights and its opposite end extending through said means and swingably connected to said other upright for mounting said means in a fixed vertical position thereon and permitting said stirrup to be swung relative to said back frame, the intermediate portion of said stirrup being releasably engageable with the underside of said seat for releasably supporting said seat in operative position.

2. An infant's car seat as set forth in claim 1 in which
   (a) said one end of said guard rail is received in an opening formed in said one upright and releasably retained therein by lock means mounted on said one upright, and
   (b) said means connecting the opposite end of said guard rail to said other upright comprises a bracket having a sleeve received around said other upright and a pair of arms projecting outwardly therefrom and swingably connected to said opposite guard rail end,
   (c) said sleeve having an arcuate slot formed therein through which said opposite end of said stirrup extends whereby upon release of said opposite guard rail end said bracket and guard rail are free to swing in a fixed horizontal orientation about the axis of said other upright.

3. An infant's car seat, comprising
   (a) a tubular back frame having a pair of interconnected laterally spaced uprights,
   (b) a pair of tubular downwardly open support hooks each having one of its ends disposed in interfitting relationship with one of said uprights,
   (c) a rod extending across said back frame adjacent the upper end thereof with its ends projecting through aligned openings formed in said uprights and said one end of said hooks for mounting said hooks on said uprights,
   (d) a seat swingably interconnected to said back frame on a transverse axis,
   (e) a flexible sheet having its upper end connected to said rod and its lower end connected to said seat to form the car seat back rest,
   (f) a U-shaped guard rail having one of its ends lockingly engageable with one of said pair of uprights and its opposite end swingably connected on a transverse axis to means rotatably mounted on the other of said pair of uprights below said rod whereby said rail is horizontally and vertically swingable with respect to said back frame, (g) said seat and guard rail being swingable between retracted positions generally parallel with said back frame and operative positions generally normal thereto, and (h) a U-shaped stirrup having one of its ends swingably connected to said one of said uprights and its opposite end extending through said means and swingably connected to said other upright for mounting said means in a fixed vertical position thereon and permitting said stirrup to be swung relative to said back frame, the intermediate portion of said stirrup being releasably engageable with the underside of said seat for releasably supporting said seat in operative position.

4. An infant's car seat, comprising (a) a back frame formed of metal-tubing and providing a pair of interconnected laterally spaced uprights, (b) a pair of downwardly open support hooks operatively connected to said uprights, (c) a seat swingably interconnected to said back frame on a transverse axis, (d) a guard rail formed from a length of metal-tubing bent into a U-shape, one end of said guard rail being flattened for reception in an elongated opening formed in one of said uprights, said flattened portion having notches formed in its upper end lower edges with the notch in said lower edge engaging the bottom of said elongated opening when the rail is in operative position, and the other end of said guard rail being swingably connected to means mounted on said other of said pair of uprights, (e) locking means swingably mounted on said one upright above the opening formed therein for swinging movement into a locking position in which it is received in the notch in said upper edge of said guard rail for releasably locking said one guard rail end in said upright opening, (f) said seat and guard rail being swingable between retracted positions generally parallel with said back frame and operative positions generally normal thereto, and (g) a U-shaped stirrup having one of its ends swingably connected to said one of said uprights and its opposite end extending through said means and swingably connected to said other upright for mounting said means thereon and permitting said stirrup to be swung relative to said back frame, the intermediate portion of said stirrup being releasably engageable with the underside of said seat for releasably supporting said seat in operative position.

References Cited in the file of this patent

UNITED STATES PATENTS

| | | |
|---|---|---|
| 2,208,392 | Sadler | July 16, 1940 |
| 2,533,527 | Soltis | Dec. 12, 1950 |
| 2,774,411 | Berlin | Dec. 18, 1956 |
| 2,869,902 | Gleitsman | Jan. 20, 1959 |
| 2,888,061 | Berlin | May 26, 1959 |

FOREIGN PATENTS

| | | |
|---|---|---|
| 591,654 | Great Britain | Aug. 25, 1947 |
| 493,952 | Belgium | Mar. 15, 1950 |
| 162,201 | Australia | Mar. 25, 1955 |
| 162,765 | Australia | May 9, 1955 |